United States Patent
Lee

(10) Patent No.: US 9,932,016 B2
(45) Date of Patent: Apr. 3, 2018

(54) CONNECTOR FOR CONNECTING A WIPER BLADE AND A WIPER ARM

(71) Applicant: KBWS CORPORATION, Daegu (KR)

(72) Inventor: Woo Sung Lee, Daegu (KR)

(73) Assignee: KBWS Corporation, Daegu (KR)

( * ) Notice: Subject to any disclaimer, the term of this patent is extended or adjusted under 35 U.S.C. 154(b) by 73 days.

(21) Appl. No.: 14/967,104

(22) Filed: Dec. 11, 2015

(65) Prior Publication Data
US 2016/0176383 A1  Jun. 23, 2016

(30) Foreign Application Priority Data
Dec. 22, 2014  (KR) .................. 10-2014-0185849

(51) Int. Cl.
*B60S 1/40* (2006.01)
*B60S 1/38* (2006.01)

(52) U.S. Cl.
CPC ........... *B60S 1/4016* (2013.01); *B60S 1/3801* (2013.01); *B60S 2001/4022* (2013.01)

(58) Field of Classification Search
CPC .... B60S 1/3801; B60S 1/4009; B60S 1/4016; B60S 2001/4022; B60S 2001/4035; B60S 2001/4058; B60S 2001/4061
See application file for complete search history.

(56) References Cited

U.S. PATENT DOCUMENTS

| 2,977,141 | A | * | 3/1961 | Ryck | .................. B60S 1/40 403/189 |
| 5,920,950 | A | * | 7/1999 | Young, III | ............ B60S 1/4016 15/250.32 |
| 6,599,051 | B1 | | 7/2003 | Jarasson | |

(Continued)

FOREIGN PATENT DOCUMENTS

| DE | 202012102614 | * | 10/2012 |
| FR | 2738201 | * | 3/1997 |

(Continued)

OTHER PUBLICATIONS

Office Action for Korean Patent Application No. KR 10-2014-0185849, dated Mar. 22, 2016, 6 Pages. (With Concise Explanation of Relevance).

(Continued)

*Primary Examiner* — Gary Graham
(74) *Attorney, Agent, or Firm* — Fenwick & West LLP

(57) ABSTRACT

A connector for connecting a wiper arm to a wiper blade may be provided. The connector according to an embodiment of the present invention includes: an adaptor which includes an opening and to which the wiper arm is fastened; and a cover part which covers at least a portion of the opening and is pivotably connected to an end of the adaptor. The cover part includes: a top surface is formed in a longitudinal direction of the connector; and a wing surface which extends downward from the top surface. Accordingly, the cover part can be prevented from being separated and can be prevented from being pushed outward in a width direction of the connector, so that a U-hook of the wiper arm is prevented from being separated and the wiper arm is connected to the wiper blade with a sense of unity.

6 Claims, 7 Drawing Sheets

(56) References Cited

U.S. PATENT DOCUMENTS

| | | | |
|---|---|---|---|
| 8,615,841 B2* | 12/2013 | Kim | B60S 1/381 |
| | | | 15/250.201 |
| 2005/0005387 A1* | 1/2005 | Kinoshita | B60S 1/3849 |
| | | | 15/250.32 |
| 2012/0110773 A1* | 5/2012 | Thielen | B60S 1/4003 |
| | | | 15/250.32 |
| 2013/0305475 A1 | 11/2013 | Kim et al. | |
| 2014/0352097 A1 | 12/2014 | Cox et al. | |
| 2014/0352099 A1 | 12/2014 | Fujiwara et al. | |

FOREIGN PATENT DOCUMENTS

| | | | |
|---|---|---|---|
| JP | 2001-163188 A | 6/2001 | |
| JP | 2002-534311 A | 10/2002 | |
| JP | 2013-100084 A | 5/2013 | |
| KR | 20110112792 A | 10/2011 | |
| WO | WO 2012-090635 A1 | 7/2012 | |
| WO | WO 2014/194085 A1 | 12/2014 | |

OTHER PUBLICATIONS

Office Action for Japanese Patent Application No. JP 2015-160793, dated Jun. 21, 2016, 5 Pages (With Concise Explanation of Relevance).

Office Action for German Patent Application No. DE 102015122357.0, dated Jul. 28, 2016, 6 Pages (With Concise Explanation of Relevance).

First Office Action for Chinese Patent Application No. CN 201510964159.X, dated Jul. 19, 2017, 10 Pages, (With English Translation).

* cited by examiner

CONNECTOR FOR CONNECTING A WIPER BLADE AND A WIPER ARM

CROSS-REFERENCE TO RELATED APPLICATION

This application claims the benefit of Republic of Korea Patent Application No. 10-2014-0185849 filed on Dec. 22, 2014, which is incorporated by reference herein in its entirety.

BACKGROUND

Field

The present disclosure relates to a connector for connecting a wiper blade and a wiper arm, and more particularly to a connector which includes an integral cover.

Description of Related Art

A wiper blade ensures driver's visibility by removing snow, rain or impurities when driving a vehicle and is connected to a wiper arm. A drive device is provided at an end of the wiper arm and the wiper arm performs a reciprocating action. Thus, the wiper blade connected to the other end of the wiper arm performs a repetitive reciprocating action in a fan shape, thereby wiping the front glass surface of the vehicle.

The wiper blade is connected to a hook provided at an end of the wiper arm through a connection member. The hook has a U-shape which is bent at the end of the wiper arm.

The wiper blade has a connection holder formed therein. A connector is placed within the connection holder. An opening is formed in the connector and allows the hook provided at an end of the wiper arm to be easily inserted thereinto. The presence of the opening allows the impurities or rainwater to permeate the opening, so that there is a requirement for a cover part for covering the opening.

However, in the past, in a wiper using the wiper arm having the U-shaped hook (U-hook), the cover part functioning as described above is provided as a separate component to the connector connecting the wiper arm and the wiper blade. Therefore, there is a high possibility that the cover part is lost.

Besides, the cover part simply functions to cover the opening. Therefore, when the cover part is lost, the hook of the wiper arm, which has been fastened to the connector, is separated from the connector, so that the wiper blade is separated from the wiper arm. If the breakdown occurs when driving the vehicle, large scale accidents may be likely to occur.

SUMMARY

One embodiment is a connector 100 which connects a wiper arm "A" to a wiper blade, the connector 100 including: an adaptor 110 which comprises an opening 125 and to which the wiper arm "A" is fastened; and a cover part 150 which covers at least a portion of the opening 125 and is pivotably connected to an end of the adaptor 110. The cover part 150 includes: a top surface 152 is formed in a longitudinal direction of the connector 100; and a wing surface 154 which extends downward from the top surface 152.

The adaptor 110 includes: a pair of mutually facing side walls 112; and a concave portion 130 which is formed concave on a portion of the side wall 112. The wing surface 154 is coupled to an outer surface of the concave portion 130 with the pivoting of the cover part 150.

The wing surface 154 may include one of a fixing projection 155 and a fixing groove 135, and the adaptor 110 may include the other one of the fixing projection 155 and the fixing groove 135.

The adaptor 110 includes: an arm fastener 115 to which the wiper arm "A" is fastened; and at least one of arm supporters 117-1, 117-2, and 117-3, which extends downward from the arm fastener 115.

The at least one of arm supporters 117-1, 117-2, and 117-3 becomes longer, farther it is from the opening 125.

The arm fastener 115 is inclined at a predetermined angle with respect to a horizontal surface of the adaptor 110. The predetermined angle is the same as an angle at which the wiper arm "A" enters with respect to the horizontal surface.

A coupling projection 140 may be formed on one of the adaptor 110 and the cover part 150, and a coupling groove 156 which is hinge-coupled with the coupling projection 140 may be formed on the other one of the adaptor 110 and the cover part 150.

DETAILED DESCRIPTION

Figure 1:
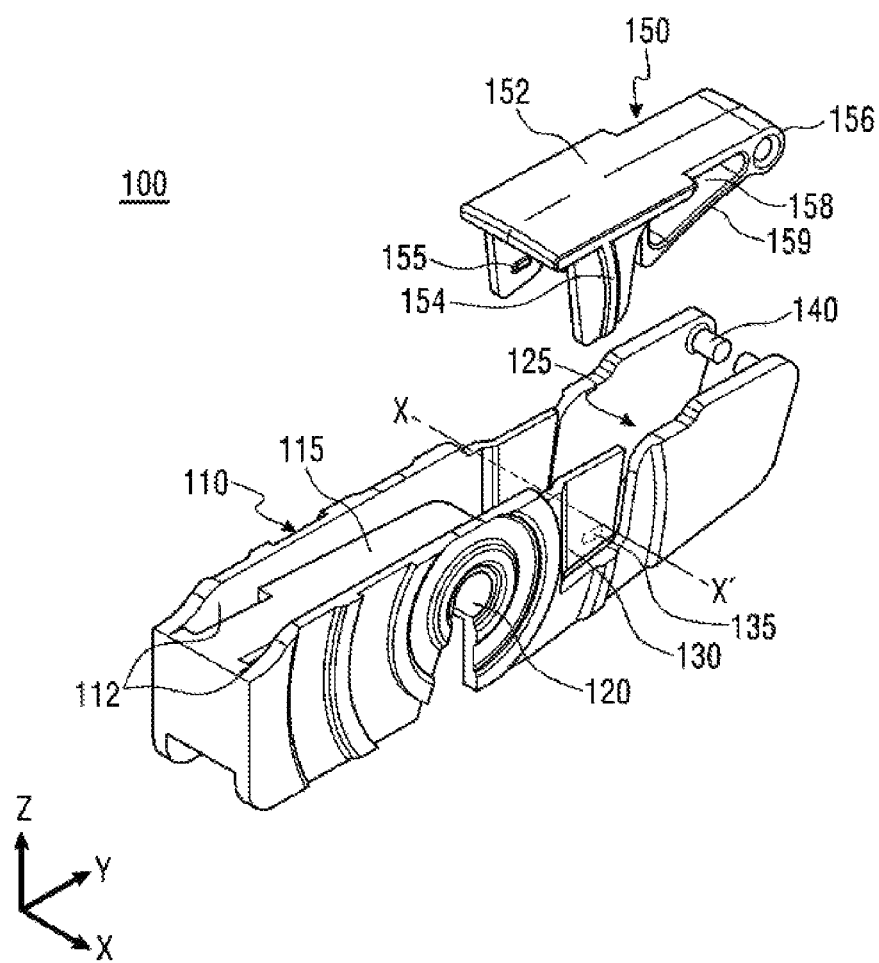
FIG. 1 is an exploded perspective view of a connector according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. The following detailed description is not intended to be limited. If adequately described, the scope of the present invention is limited only by the appended claims of the present invention as well as all equivalents thereto. Similar reference numerals in the drawings designate the same or similar functions in many aspects.

Also, in the components of the present invention, detailed descriptions of what can be clearly understood and easily carried into practice by those skilled in the art will be omitted to avoid making the subject matter of the present invention unclear.

Hereafter, an embodiment of the present invention will be described in detail with reference to the accompanying drawings. FIG. 1 is an exploded perspective view of a connector 100 according to an embodiment of the present invention. First, in order to make position relations clear, a coordinate is shown on the bottom left of FIG. 1.

As long as there is no particular mention in the following detailed description, an X-axis refers to a right-and-left direction or a width direction, a Y-axis refers to a forward-and-backward direction or a longitudinal direction, and a Z-axis refers to an up-and-down direction or a height direction.

As shown in FIG. 1, the connector 100 according to the embodiment of the present invention includes an adaptor 110 and a cover part 150.

The adaptor 110 may include a pair of side walls 112, an arm fastener 115, an axis coupling groove 120, an opening 125, a concave portion 130, a fixing groove 135, and a coupling projection 140. Although not apparently shown in FIG. 1, the adaptor 110 may further include at least one arm supporter (not shown) which protrudes downwardly from the arm fastener 115.

The side walls 112 of the adaptor 110 form both side frames of the connector 300. The arm fastener 115 is provided between both side walls 112. When a wiper arm "A" is coupled to the connector, a U-hook of the wiper arm "A" is fastened to the arm fastener 115.

The side wall 112 extends in a longitudinal direction thereof from an area in which the arm fastener 115 is positioned to an area in which the cover part 150 is positioned.

The axis coupling groove 120 is coupled to and engaged with a central axis (not shown) formed on a wiper blade. The connector 100 is fixed to the wiper blade by the axis coupling groove 120. The wiper arm "A" is fastened to the connector 100, so that the wiper blade can be connected to the wiper arm.

The opening 125 provides an enough space for an end of the wiper arm "A" to be fastened thereto. Therefore, the opening 125 may have a length enough to provide a space for allowing an end of the wiper arm "A," specifically a U-shaped arm fastening portion of the U-hook, to be inserted into the arm fastener 115.

As shown in FIG. 1, the concave portion 130 is formed toward the inside of the opening 125 at the position of the opening 125 on the side walls 112. FIG. 1 shows that a portion of the concave portion 130 is separated from the side wall 112 of the adaptor 110. Alternatively, the entire concave portion may be connected to the side wall 112.

The adaptor 110 may include the coupling projection 140 which couples the adaptor 110 and the cover part 150. A pair of the mutually facing coupling projections 140 may be provided on one end of the side wall 112 or may be provided in the form of a bridge crossing between the side walls 112. When a pair of the coupling projections 140 is provided in the form of a bridge crossing between the side walls 112, a coupling groove 156 of the cover part 150 may have a shape which is couplable to the coupling 140 in response to the bridge shape.

Also, the concave portion 130 may include the fixing groove 135 for restricting the pivoting of the cover part 150 and fixing the cover part 150. The fixing groove 135 is configured to fix the cover part 150 to the adaptor 110 by receiving a below-described fixing projection 155 of the cover part 150. Meanwhile, in the embodiment of the present invention, it is described that the fixing groove 135 is provided in the concave portion 130 and the fixing projection 155 is provided on the cover part 150. However, in another embodiment, the fixing groove 135 may be provided in the cover part 150 and the fixing projection 155 may be provided on the concave portion 130.

The above-described components of the adaptor 110 are not necessarily individually provided. As long as the same function is performed, at least two components may be implemented as one component, and one component may be implemented by being divided into a plurality of components.

In the meantime, the cover part 150 may include a top surface 152, a wing surface 154, the fixing projection 155, the coupling groove 156, a rib reinforcing part 158, and a rib 159.

The top surface 152 covers the opening 125 of the adaptor 110, and thus, prevents foreign substances from being introduced or the wiper arm from being separated.

The wing surface 154 is continuous from the top surface 152 and extends downward from the top surface 152 in a height direction of the cover part 150. The wing surface 154 is coupled to the adaptor 110 in the form of surrounding the outside of the concave portion 130 of the adaptor 110 by the pivoting of the cover part 150. Accordingly, the concave portions 130 can be prevented from being pushed outward in a width direction. This will be described in more detail with reference to FIGS. 3a and 3b.

Meanwhile, the wing surface 154 may include the fixing projection 155. The fixing projection 155 is received in the fixing groove 135 formed in the concave portion 130 of the adaptor 110 and limits the pivoting of the cover part 150.

The coupling groove 156 of the cover part 150 may be provided on the same axis (pivot axis) with the coupling projection 140 of the adaptor 110. Due to the coupling groove 156 of the cover part 150 and the coupling projection 140 of the adaptor 110, the cover part 150 can be pivoted about the pivot axis.

With the pivoting of the cover part 150, the rib reinforcing part 158 is inserted into the inside of the opening 125 of the adaptor 110. With the pivoting of the cover part 150, the rib 159 projecting from the rib reinforcing part 158 in the width direction of the cover part 150 is also inserted into the inside of the opening 125 of the adaptor 110.

The overall outer width of the rib reinforcing part 158 including the rib 159 may be the same as the inner width of the opening 125 of the adaptor 110. Therefore, the opening 125 is fully closed, so that it is possible to prevent foreign substances from being introduced into the inside of the adaptor 110, more specifically, from being introduced through the opening 125. Here, the rib reinforcing part 158 and the rib 159 may be formed to have various widths and lengths. Further, unlike the above description, the overall outer width of the rib reinforcing part 158 including the rib 159 may be less than the inner width of the opening 125 of the adaptor 110. Even in this case, since the cover part 150 exists, foreign substances can be prevented from being introduced.

It can be considered that the components included in the cover part 150 are not necessarily individually provided. As long as the same function is performed, at least two components may be implemented as one component, and one component may be implemented by being divided into a plurality of components.

Figure 2:
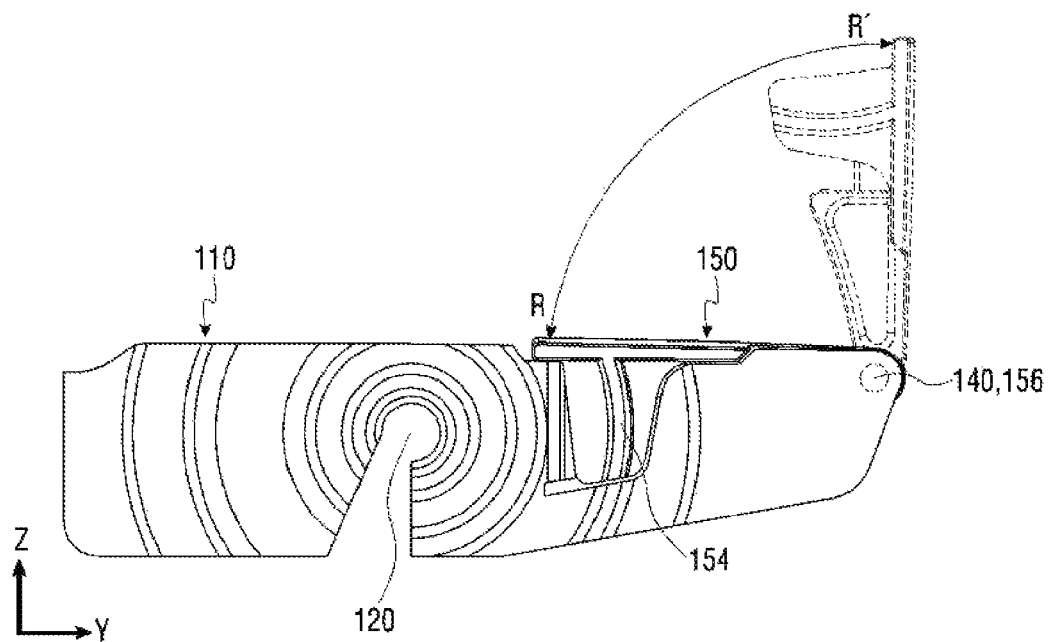
FIG. 2 is a side view of the connector according to the embodiment of the present invention.

FIG. 2 is a side view of the connector according to the embodiment of the present invention. As shown in FIG. 2, the cover part 150 is coupled to the coupling projection 140 of the adaptor 110 through the coupling groove 156. The cover part 150 is pivotably connected with the adaptor 110 on the axis on which the coupling groove 156 and the coupling projection 140 are fastened. In FIG. 2, the cover part 150 is able to pivot between a fixing position "R" and a release position "R'".

In the meantime, FIGS. 1 and 2 show that the coupling groove 156 is provided in the cover part 150 and the coupling projection 140 is provided on the adaptor 110. However, in another embodiment of the present invention, it can be considered that the cover part includes the coupling projection and the adaptor includes the coupling groove. Also, the coupling of the adaptor 110 and the cover part 150 can be performed by various pivotable structures (e.g., a hinge structure).

Figure 3A:
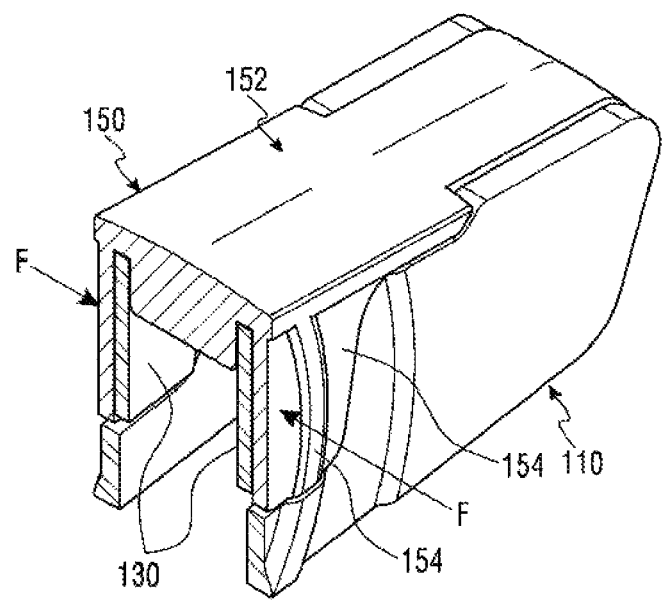
FIG. 3a is a sectional perspective view of the connector according to the embodiment of the present invention, taken along line X-X' of FIG. 1.
Figure 3B:
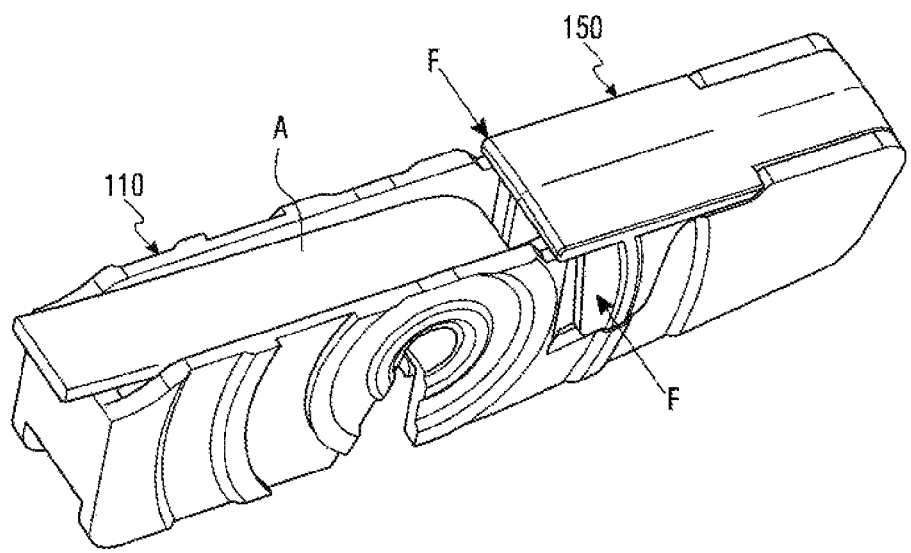
FIG. 3b is a configuration view showing the connector according to the embodiment of the present invention in a state where a wiper arm has been coupled to the connector.
Figure 3B:
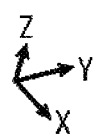

As shown in FIG. 2, when the cover part 150 is pivoted, the wing surfaces 154 on both sides of the cover part 150 fall in the form of surrounding the outer surface of the concave portion 130. FIGS. 3a and 3b show that the cover part 150 is located at a fixing position "R" after being pivoted.

FIG. 3a is a sectional perspective view of the connector 100 according to the embodiment of the present invention, taken along line X-X' of FIG. 1. FIG. 3b is a configuration view showing the connector 100 in a state where the wiper arm "A" has been coupled to the connector.

As shown in FIG. 3a, the wing surface 154 of the cover part 150 may go down and surround the outer surface of the concave portion 130 by the pivoting of the cover part 150. The rib reinforcing part 158 and rib 159 of the cover part 150 are inserted into the opening 125.

In a state where the wiper arm "A" has been coupled, when the U-hook moves back and forth, the concave portions 130 adjacent to an end of the U-hook tend to be pushed outward in the width direction. However, in the connector 300 according to the embodiment of the present invention, the wing surfaces 154 of the cover part 150 goes down and surrounds the outer surface of the concave portion 130 and applies a force "F" to the adaptor 110 inwardly. Therefore, even though the U-hook moves back and forth, the concave portions 130 are not pushed outward in the width direction. This means that the durability of the adaptor 110 is improved. In other words, the concave portion 130 is arranged to prevent the wiper arm "A" from moving back and forth.

In summary again, as shown in FIG. 3b, since the wing surfaces 154 of the cover part 150 surround the outer surface of the concave portion 130 adjacent to the end of the wiper arm "A", the concave portion 130 is prevented from being pushed outward in the width direction and the U-hook of the wiper arm "A" is fixed without moving back and forth.

In the meantime, in another embodiment, only single wing surface may be provided instead of a pair of the wing surfaces. In this case, the concave portion 130 may be formed to extend only on single side wall 112 of the adaptor 110.

Figure 4:
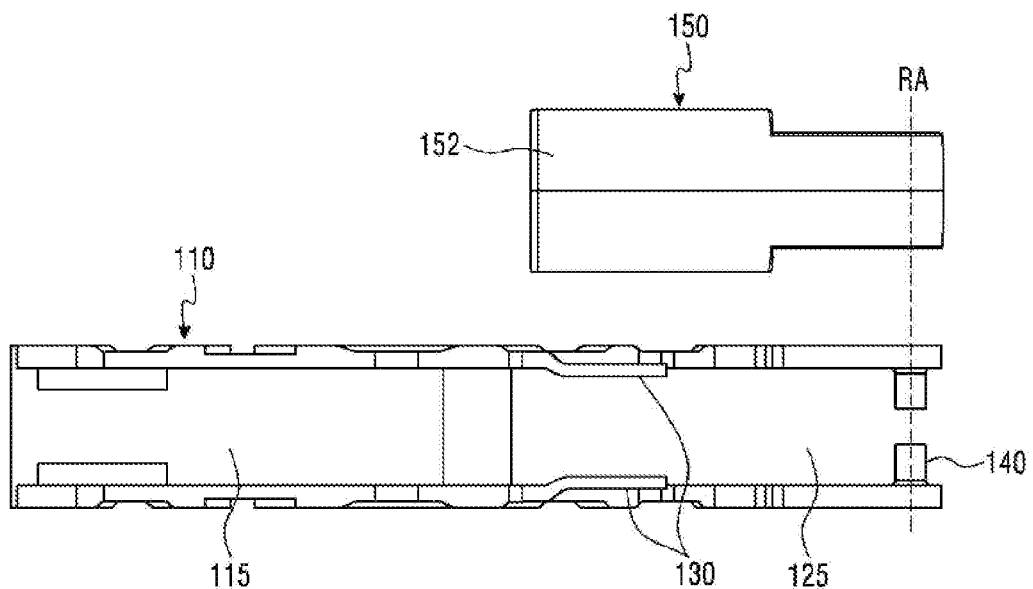
FIG. 4 is a top view of the connector according to the embodiment of the present invention.

FIG. 4 is a top view of the connector 100 according to the embodiment of the present invention. For the purpose of understanding the connector 100, FIG. 4 shows that the adaptor 110 is separated from the cover part 150.

As shown in FIG. 4, the top surface 152 of the cover part 150 has a greater width at the position of the wing surface 154. Accordingly, the wider portion of the top surface 152, that is, a portion of the top surface 152, at which the wing surface 154 is positioned, and the wing surface 154 are able to function as a handle for opening and closing the cover part 150. A user is allowed to more easily pivot the cover part 150 by using the handle.

Also, as shown, the wing surface 154 may further include a rib projecting outwardly. This increases an area to be caught by user's finger, and thus, enhances the function of the handle. To obtain the same effect as described above, in another embodiment, the wing surface 154 may be made of a material having a high friction coefficient or the feel of a material of the wing surface 154 may be differentiated by patterning the wing surface 154.

Figure 5:
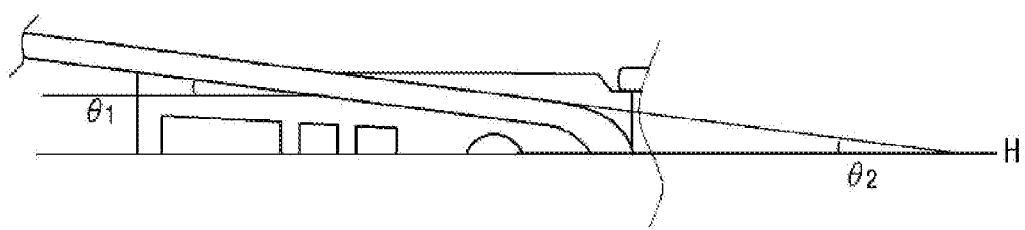
FIG. 5 is a fragmentary sectional view of the connector according to the embodiment of the present invention.

FIG. 5 is a fragmentary sectional view of the connector 100 according to the embodiment of the present invention. FIG. 5 shows that the wiper arm "A" has been connected to the adaptor 110 and shows the enlarged configuration of the arm fastener 115.

The wiper arm "A" is directly connected to the arm fastener 115. An end of the arm fastener 115, that is, a round portion having a predetermined radius of curvature comes in contact with the end of the U-hook having a predetermined radius of curvature.

Meanwhile, the arm fastener 115 has a shape which is inclined at a certain angle $\theta_1$ with respect to a horizontal surface of the adaptor 110. Here, the inclined angle $\theta_1$ of the arm fastener 115 may be the same as an angle $\theta_2$ formed by the wiper arm "A" and the horizontal surface (the horizontal surface of the adaptor 110 or the horizontal surface of the wiper blade).

In general, an end of the wiper arm "A" is connected to a motor and the other end is connected to the wiper blade. In a state where the wiper blade including a wiper strip is in close contact with the glass of a vehicle, the wiper arm "A" performs a repetitive reciprocating action in the form of a circular arc. For such an operation, due to the coupling structure of the wiper arm "A" and the wiper blade, it is difficult to couple the wiper arm "A" and the wiper blade on a complete horizontal surface, and the wiper arm "A" and the wiper blade are coupled to each other with an inclination at a certain angle.

Referring to FIG. 5, when the wiper arm "A" is coupled to the connector 100, the wiper arm "A" enters at a predetermined angle $\theta_2$. Since the arm fastener 115 to which the wiper arm "A" is fastened has a shape inclined at an angle that is the same as an angle at which the wiper arm "A" enters (an angle at which the wiper arm "A" enters with respect to a horizontal surface "H" of the connector 100), the connector 100 according to the embodiment of the present invention is connected to the wiper arm "A" with a sense of unity.

The arm fastener 115 that is a component of the connector 100 according to the embodiment of the present invention has a shape which is inclined at a predetermined angle $\theta_1$ with respect to the horizontal surface of the adaptor 110. The predetermined angle $\theta_1$ is the same as the angle $\theta_2$ at which the wiper arm "A" enters with respect to the horizontal surface "H" of the connector 100. Therefore, the wiper arm "A" can be connected with a sense of unity.

Figure 6A:
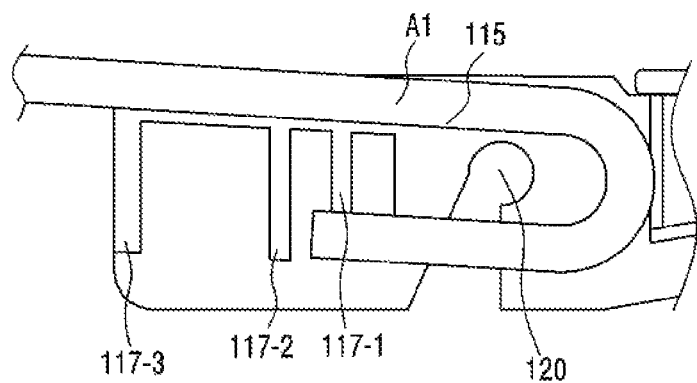
FIGS. 6a and 6b are fragmentary sectional views of the connector to which the wiper arm has been coupled in accordance with the embodiment of the present invention.
Figure 6B:
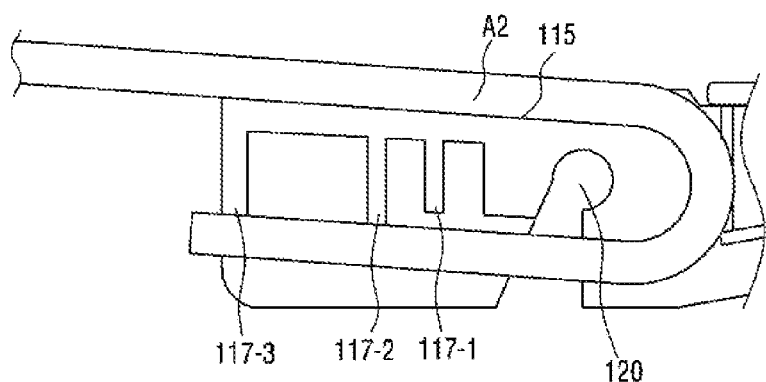

FIGS. 6a and 6b are fragmentary sectional views of the connector 100 to which the wiper arm "A" has been coupled in accordance with the embodiment of the present invention. As shown in FIGS. 6a and 6b, the connector 100 according to the embodiment of the present invention may include a plurality of arm supporters 117-1, 117-2, and 117-3 which project downwardly from the arm fastener 115.

The U-hook type wiper arm "A" has a variety of thicknesses and various radii of curvature according to the thickness. The U-hook may have a large radius of curvature and widely bent or may have a small radius of curvature and narrowly bent. The connector 100 according to the embodiment of the present invention has a structure capable of connecting various wiper arms "A" to the wiper blade.

As shown in FIGS. 6a and 6b, the arm fastener 115 may include the plurality of arm supporters 117-1, 117-2, and 117-3. The arm supporters 117-1, 117-2, and 117-3 may have a variety of lengths. It is desirable that the arm supporter becomes longer, farther it is from the opening 125.

FIG. 6a shows that the wiper arm "A" including the U-hook having a small radius of curvature has been fastened. The U-hook having a small radius of curvature is fastened in contact with the shortest arm supporter 117-1.

Here, although it is shown that only the short arm supporter 117-1 is provided, a larger number of the short arm supporters can be provided.

FIG. 6b shows that the wiper arm "A" including the U-hook having a relatively larger radius of curvature has been fastened. As shown in FIG. 6b, the U-hook having a relatively larger radius of curvature is fastened in contact with the relatively longer arm supporters 117-2 and 117-3.

Here, although it is shown that the two long arm supporters 117-2 and 117-3 are provided, a smaller or larger number of the long arm supporters can be provided.

The connector 100 according to the embodiment of the present invention includes the arm supporters 117-1, 117-2, and 117-3 having a variety of lengths, so that various wiper arms "A" can be fastened to the connector 100.

Figure 7:
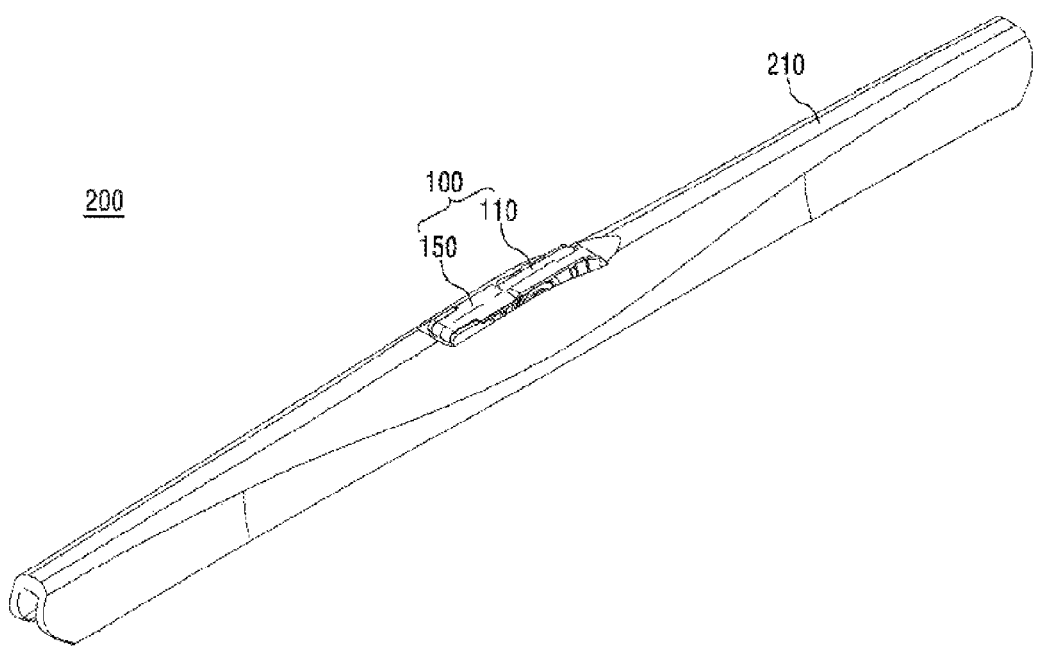
FIG. 7 is a perspective view of a wiper blade according to the embodiment of the present invention.

FIG. 7 is a perspective view of a wiper blade 200 according to the embodiment of the present invention. As shown in FIG. 7, the wiper blade 200 according to the embodiment of the present invention includes a wiper strip (now shown) wiping a glass surface of the vehicle, a yoke lever (not shown) supporting the wiper strip, a main lever 210 connected to the yoke lever, and a connection holder (not shown) formed on the central portion of the main lever 210.

The wiper strip (now shown) contacts directly with and wipes the glass surface of the vehicle, and thus, removes impurities, snow, rain or the like. The wiper strip is made of either an elastic material like rubber or an elastic composite material.

The yoke lever (not shown) supports directly the wiper strip. A plurality of the yoke levers may be provided. A portion of the yoke lever, which supports the wiper strip, may have a yoke shape.

A central axis (not shown) is formed in the connection holder and is coupled to and engaged with the axis coupling groove 120 of the connector 100 according to the embodiment of the present invention. The connector 100 according to the embodiment of the present invention may be housed (coupled) in the connection holder of the wiper blade 200 according to the embodiment of the present invention.

Meanwhile, the connector 100 included in the wiper blade 200 includes the adaptor 110 and the cover part 150. Since this has been described above in detail, a description thereof will be omitted.

Figure 8:
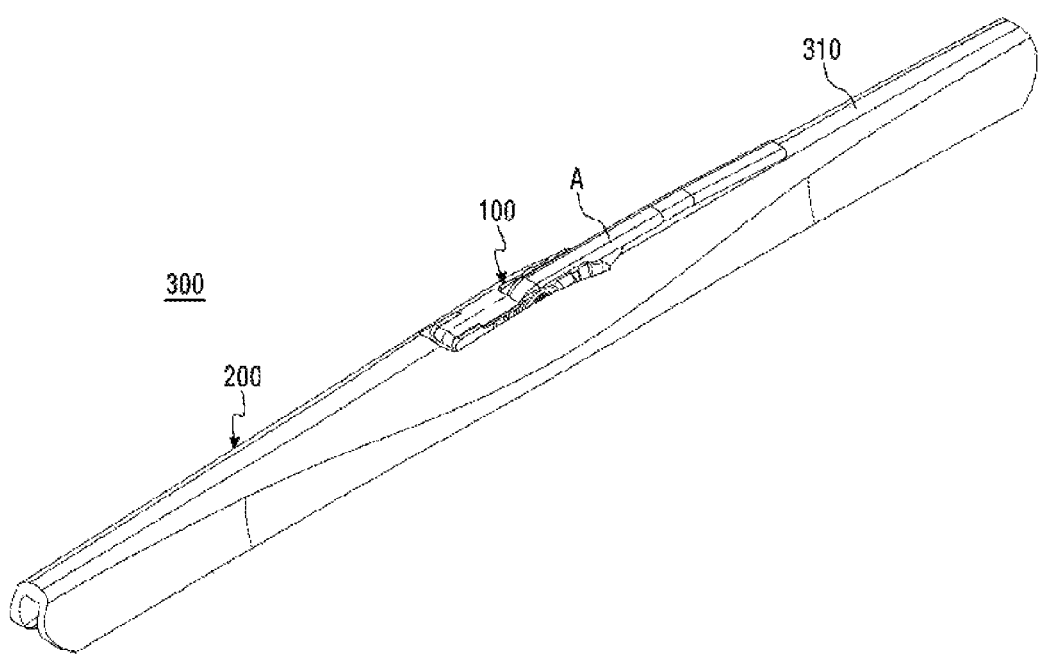
FIG. 8 is a perspective view of a wiper according to the embodiment of the present invention.

FIG. 8 is a perspective view of a wiper 300 according to the embodiment of the present invention. As shown in FIG. 8, the wiper 300 according to the embodiment of the present invention includes the wiper blade 200 and the wiper arm "A". The wiper blade 200 includes the connector 100. The connector 100 includes the adaptor 110 and the cover part 150. Since the components included in the wiper 300 and their function have been described above in detail, a description thereof will be omitted.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A connector which connects a wiper arm to a wiper blade, the connector comprising:
    an adaptor which comprises:
        an opening to which the wiper arm is fastened,
        a pair of mutually facing side walls, and
        a concave portion which is concaved toward the opening on a portion of the side wall and prevents the wiper arm from moving in a longitudinal direction of the adaptor; and
    a cover part which covers at least a portion of the opening and is pivotably connected to an end of the adaptor, wherein the cover part comprises:
        a top surface which is formed in a longitudinal direction of the connector, and
        a wing surface which extends downward from the top surface, wherein the wing surface is coupled to an outer surface of the concave portion and prevents the concave portion from being pushed outward in a width direction of the adaptor.

2. The connector of claim 1, wherein the wing surface comprises one of a fixing projection and a fixing groove, and the adaptor comprises the other one of the fixing projection and the fixing groove.

3. The connector of claim 1, wherein the adaptor comprises:
    an arm fastener to which the wiper arm is fastened; and
    at least one arm supporter extending downward from the arm fastener.

4. The connector of claim 3, wherein the at least one arm supporter comprises a plurality of arm supporters respectfully extending longer, the farther they are from the opening.

5. The connector of claim 3, wherein the arm fastener is inclined at a predetermined angle with respect to a horizontal surface of the adaptor, and wherein the predetermined angle is the same as an angle at which the wiper arm enters with respect to the horizontal surface.

6. The connector of claim 1, wherein a coupling projection is formed on one of the adaptor and the cover part, and a coupling groove which is hinge-coupled with the coupling projection is formed on the other one of adaptor and the cover part.

* * * * *